April 21, 1970  E. D. CAUSEY  3,507,487
WORKBENCH FOR PIPE ASSEMBLY
Filed March 30 1967  2 Sheets-Sheet 1
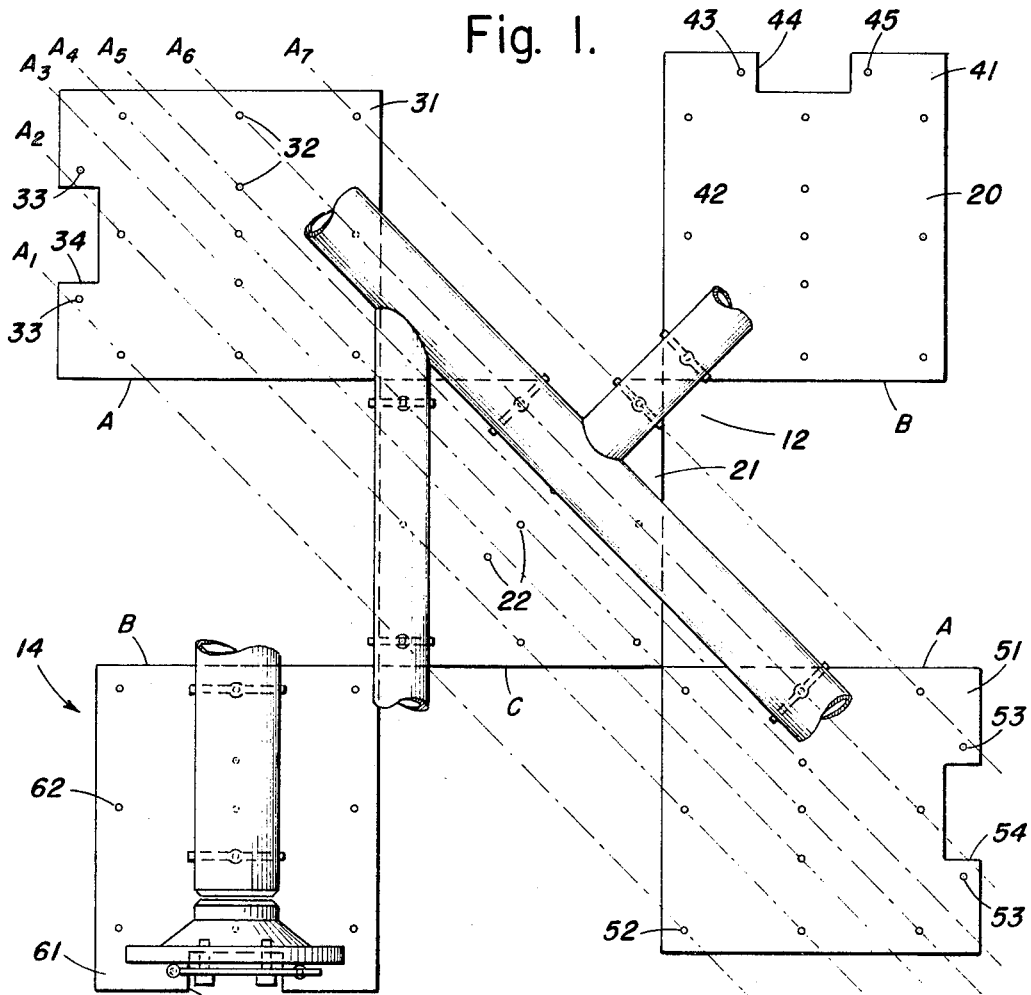
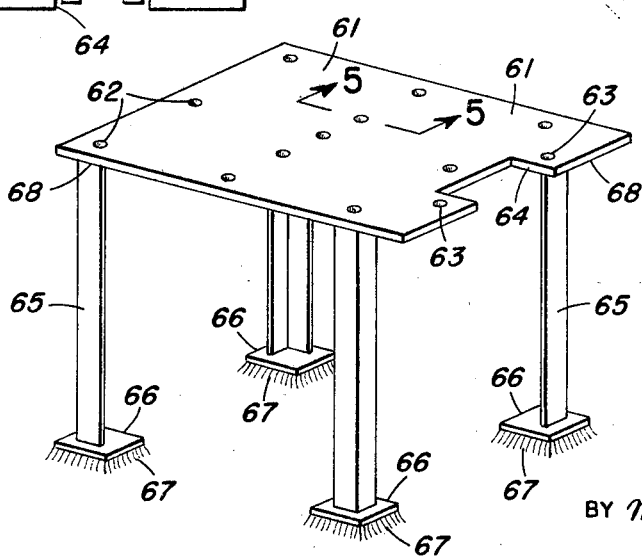
INVENTOR
Earl D. Causey
BY Marn & Jangarathis
ATTORNEYS

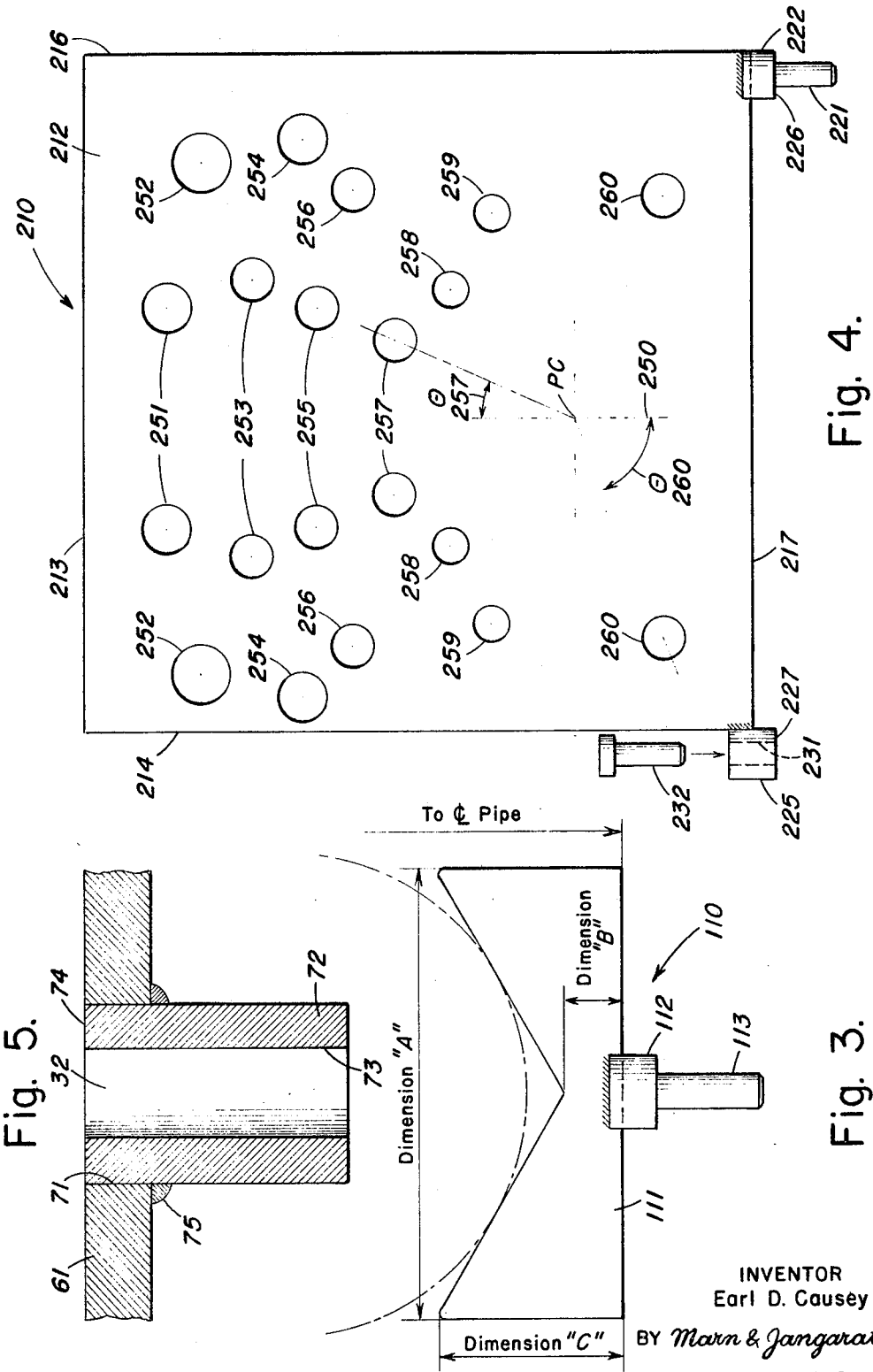

United States Patent Office 3,507,487
Patented Apr. 21, 1970

3,507,487
WORKBENCH FOR PIPE ASSEMBLY
Earl D. Causey, Hertford, England, assignor to The Lummus Company, New York, N.Y., a corporation of Delaware
Filed Mar. 30, 1967, Ser. No. 627,102
Int. Cl. B23q 3/02, 3/00
U.S. Cl. 269—40          7 Claims

ABSTRACT OF THE DISCLOSURE

This disclosure is directed to a pipe assembly workbench wherein pipe jigs and flange plate jigs are selectively mounted on bed plates, in a group of arranged bores, to allow rapid layout of pipe assemblies for tacking or welding. Each pipe jig supports the pipe to be assembled at a level above the bed plate such that the pipe centerline is contained in a plane located parallel to and above the bed plate. Similarly, each flange plate jig supports a flange mounted thereon for assembly so that the flange centerline is also contained in the same plane which contains the centerlines of the jig supported pipe. Thus, as a pipefitter lays the assembly components in or on the jigs, they are immediately squared and aligned, and ready for tacking.

DISCLOSURE

One of the most time consuming steps in laying out pipe for fabrication is that of leveling, facing and supporting the elements which are being joined. Heretofore, it has been the practice, particularly in instances of on-site fabrication, to use levels and packing wedges to match pipe sections, and to rely upon the pipefitter's mate in matching flanges to pipe sections. Obviously, this practice leaves much to be desired in that slippage occurs causing misalignment, each fabrication must be treated as a new job from the beginning, and the overall process is exceedingly time consuming and thus expensive.

Those concerned with the economics of pipe fabrication have recognized that an assembly table which will assist in fabrication layout can materially reduce pipefitting costs. Such tables have been developed, but for the most part, they have been limited in their adaptability to all pipefitting assembly problems and, by reason of their design, have not been adequately successful in achieving maximum economy.

It is an object of the present invention, therefore, to provide a simple and inexpensive, as well as versatile pipe fabrication workbench.

Another object of the present invention is to provide a pipe fabrication workbench that is of such size and structure that it is portable.

A further object of the present invention is to provide a pipe fabrication workbench that is capable of use as an ordinary workbench when not in use for pipe fabrication.

Yet another object of the present invention is to provide a pipe fabrication workbench having fittings which facilitate the layout and fabrication of diverse size piping and flanges without the use of levels or shims and in a minimum of time.

These and other objects are attained by providing a workbench having a multi-section bed with a planar surface, each section being independently supported and having bores therein for receiving the mounting pins of pipe assembly jig fittings, and pipe jigs and flange plate jigs which are adapted for mounting on the workbench and which support pipe and pipe fittings of diverse sizes in such a position that their centerlines are contained in a plane parallel to the planar surface of the bed and spaced thereabove by a preselected distance.

A pipe assembly workbench according to the present invention is the embodiment of simplicity. Aside from the structure for swinging the flange plate jigs into and out of position, there are no moving parts. No parts require any maintenance in the form of lubrication or otherwise. Further, no clamps or other securing devices are required to hold positioned pipe in place since the design of the jigs is such that gravity secures the segments in place. There is no requirement for adjusting handwheels to select centerline heights, nor does changing a set up require the unscrewing or screwing of screws, nuts or bolts.

A pipe assembly workbench according to the present invention may be set for use in a matter of seconds. Since all pipe jigs and flange plate jigs are pre-sized, it is only required that pipe jigs of the size for use with the pipe sections to be joined, be placed in the bores of the bed plate as required by the desired layout. Also, if required, the flange plate jigs may be placed in the appropriate mounting bores.

Once the pipe assembly workbench is set, pipe layout becomes a matter of laying the pipe sections and flanges in their respective jigs. In this regard, it has been my experience that a flange can be fit to a pipe end and readied for tacking by a single worker, in as little as 10 seconds when the pipe being worked is 3 or 4 inch, to as much as 15 seconds when the pipe being worked is 10 inch. The prior methods of layout took approximately 6 man minutes for 3 and 4 inch, 10 man minutes for 6 and 8 inch and 16 man minutes for 10 inch pipe. The relative savings therefore have been as much as 97% for the smaller size pipe and 98% for the larger size pipe.

The present invention may be better understood from a consideration of the following specification in the light of the accompanying drawings, wherein:

FIG. 1 is a plan view of a pipe assembly workbench according to the present invention;

FIG. 2 is a perspective view of one section of a pipe assembly workbench according to the present invention;

FIG. 3 is a front elevational view of a pipe jig for use with the pipe assembly workbench of FIG. 1;

FIG. 4 is a front elevational view of a flange plate jig for use with the pipe assembly workbench of FIG. 1; and FIG. 5 is a cross-sectional view through the plane 5—5 of FIG. 2.

Referring now to the drawings, there can be seen in FIG. 1 two individual piping layouts designated generally by the numerals 12 and 14, which are typical of piping arrangements which may be economically and rapidly fabricated using a pipe assembly workbench according to the present invention. A planar bed surface 20 is defined by the surfaces of five bed plates 21, 31, 41, 51 and 61. The bed plates are arranged with one plate 21 centrally positioned and one each of the remaining plates 31, 41, 51 and 61 positioned at the four corners of the centrally disposed plates with their respective sides being aligned. In the described embodiment, the bed plates are shown as being square, but this is not critical and they may be of any geometric configuration desired or dictated by the environmental circumstances.

Each bed plate is provided with pipe jig mounting bores 22, 32, 42, 52 and 62, and all bed plates except the centrally positioned bed plate 21, are provided with flange plate jig mounting bores 33, 43, 53 and 63. The layout of these mounting bores will be discussed in detail hereinafter. Each of the outer bed plates 31, 41, 51 and 61, has a rectangularly shaped recess portion 34, 44, 54 and 64 in one side thereof. The bed plates are positioned in such a manner that each of the recessed portions faces outwardly from the centrally positioned bed plate 21 and also so that no recessed portion faces outwardly in the same direction as any other.

It is to be noted, however, that the bed plates may be provided with more or fewer pipe jig mounting bores, flange plate jig mounting bores or recessed portions depending upon the desired flexibility of the workbench. Thus, by providing more than one set of flange plate jig mounting bores and more than one recessed portion on a bed plate, pipe layouts can be made having directly adjacent flange portions.

Each bed plate is mounted individually and supported at its corners by legs 25, 35, 45, 55 and 65. As can be seen in FIG. 2 which shows the support for bed plates, each leg 65 is mounted on a metal plate 66 positioned on a level concrete pad 67. The corners 68 of the underside of bed plate 61 are machined to be parallel with the planar upper surface of the bed plate, the upper and lower ends of legs 65 are machined to be parallel with each other and to have each leg equal in length to every other leg, and the support pads 67 with plate 66 are constructed so as to be horizontal and in a common plane. Thus, the upper planar surface of each bed plate will be horizontal and in the same plane as every other bed plate forming the workbench surface.

As was mentioned above, all bed plates are provided with pipe jig mounting bores 22, 32, 42, 52 and 62 and all but bed plate 21 are provided with flange plate jig mounting bores 33, 43, 53 and 63. In the described workbench, all the mounting bores are identical both in size and in structure. It is to be recognized, however, that these bores may be provided otherwise than as shown without departing from the inventive concept of my workbench.

Referring now to FIG. 5, each mounting bore in the bed plates of the present invention is constructed by accurately boring a vertical hole 71 having a diameter of, for example, two inches, through a bed plate, for example, 61. A machined boss 72, having an outside diameter of two inches and a centrally disposed, longitudinally extending one inch diameter bore 73 therethrough, is mounted in the bed plate hole so that its end 74 is flush with the upper surface of the bed plate 61. The boss is secured in this position by a suitable method such as welding to the underside of the bed plate at 75.

During the fabrication of a pipe assembly the sections of pipe are supported in position by pipe jigs. A pipe jig, designated generally by the numeral 110, for use in my invention is shown in FIG. 3 and comprises a plate element 111 which may be made of, for example, ¾″ thick mild steel, having a V-shaped recessed portion in the upper portion thereof for receiving the pipe to be supported. A vertical positioning collar 112 is provided on a mounting pin 113 which is sized to be snugly received in the mounting bores of the bed plates. The dimensions of the pipe jigs vary depending upon the size of pipe to be supported, but for purposes of by invention, their values are determined so as to insure that the longitudinal centerline of each pipe section is at a preselected distance above the planar surface of the bed, notwithstanding diversity in pipe sizes. Following is a tabulation of dimensions which have been calculated to describe pipe jigs which locate the pipe centerline plane at a distance of 8¼ inches above the surface of the bed plate. This dimension corresponds to a distance of 8¼ inches above the lower surface of vertical positioning collar 112 which is machined to fit flush against the bed plate surface.

| Pipe size | A | B | C |
|---|---|---|---|
| 3″ | 4″ | 5.48″ | 6.63″ |
| 4″ | 4″ | 4.9″ | 6.05″ |
| 6″ | 6″ | 3.68″ | 5.41″ |
| 8″ | 8″ | 2.5″ | 4.81″ |
| 10″ | 10″ | 1.3″ | 4.1875″ |

Thus it can be seen that if a pipe centerline plane height of 8¼″ is selected, pipe sizes up to 10 inch standard diameter may be accommodated. A series of jigs, each having the same basic configuration and dimensioned according to the above table can be manufactured inexpensively, used repeatedly and will be adequately sized for most on-site fabrication requirements. It is to be noted that the V-shaped recessed portion of the jig which supports the pipe, obviates the usual requirement for piping clamps or other securing means since this configuration provides for the pipe to be held in place by gravity.

A flange plate jig for use with the present invention is shown in FIG. 4. The jig designated generally by the numeral 210, comprises a plate 212 having an upper edge 213, side edges 214, 216 and a lower edge 217. The plate may be made of ¾″ thick mild steel, having a series of holes bored therethrough. The pattern and layout of the holes will be described more fully hereinafter. A mounting pin 221 having a vertical positioning collar 222 is secured, such as by welding to the lower edge 217 of plate 212 at the corner thereof adjacent side edge 216. A vertical positioning collar 225 is secured, such as by welding, to side edge 214 of plate 212 at the corner thereof adjacent lower edge 217. Collar 225 is positioned with respect to plate 212 so that it extends the same amount below lower plate edge 217 as does the lower surface 226 of collar 222. The lower surface 226 of collar 222 and the lower surface 227 of collar 225 are machined so as to be coplanar. Vertical positioning collar 225 has a bore 231 therein for receiving a mounting pin 232 snugly therethrough. It can be seen, therefore, that to position flange plate jig 210 on the workbench, mounting pin 221 is positioned in a flange plate jig mounting bore such as 33, vertical positioning collar 25 is then positioned over a corresponding mounting bore 33 by rotating the flange plate jig around mounting pin 221, and mounting pin 232 is inserted through bore 231 into snug engagement with mounting bore 33. Positioning the flange plate by swiveling around mounting pin 221 is desirable because it allows a flange to be attached to the plate and then swung, with the plate, into the desired fabrication position.

Referring back to FIG. 1, it can be seen that there are three basic arrangements of pipe jig mounting bores, that of bed plate section 21, that of bed plate sections 31 and 51, and that of bed plate sections 41 and 61. As was noted above, any arrangement of pipe jig mounting bores may be provided to accommodate virtually any piping arrangement anticipated. The arrangement hereinafter disclosed as an example, has been found to be fully satisfactory for the fabrication of pipe ranging in size from 4 to 10 inches. Each bed plate section is a ¾″ plate 3′5″ long and 3′0″ wide. In essence, the plate may be thought of as being a 3′0″ x 3′0″ square portion for receiving the pipe jig mounting bores, and a 3′0″ x 5″ end portion for receiving the flange plate jig mounting bores and flange accommodation recessed portion. The square portion of each plate has 9 basic pipe jig mounting bores arranged in three parallel line of three each. The bores are on 1′3″ centers, and centrally arranged of the square portion of the plate. The recessed portion of each plate end portion is a centrally disposed, 12″ x 5″ cut out. Each of the flange plate jig mounting bores is arranged centrally of the end portion of the plate, and disposed 2″ inwardly from the adjacent edge of the recessed portion.

Additionally, each plate has two pipe jig mounting bores, spaced 6″ to centers, on each side of the center pipe jig mounting bore. As is best seen in FIG. 1, the two plates 31, 51 have the additional holes disposed along an axis which is perpendicular to their long side, the two plates 41, 61, have the additional holes disposed along an axis which is parallel to their long side, and the center plate 21 has its additional holes disposed on an axis oriented at an angle of 45° to its plate sides.

The pipe jig mounting bores thus arranged, afford a great number of potential pipe layout centerlines. Illustratively, centerlines $A_1$ through $A_7$ have been shown in FIG. 1 as being typical of the numerous possible combinations made available by this arrangement.

Referring now to FIG. 4, the flange plate jig has been provided with flange mounting bores to provide accommodation for any size flange from that for 3″ pipe to that for 10″ pipe, both 150 pound and 300 pound rating. Two holes are provided for each size flange so that when a particular flange is to be positioned, it is only necessary that the flange be properly placed against the jig and pins inserted through the appropriate jig bores and corresponding flange bolt holes to maintain the flange in assembly position. As can be seen from FIG. 4, the holes on one side of the centerline 250 of the flange plate jig are symmetrical with those of the other side of the centerline 250 of the flange plate jig. Thus, the following table, in conjunction with FIG. 4, can be used to lay out a flange plate jig for use with the disclosed embodiment of the present invention:

| Hole No. | Flange size | Dimension E | Dimension F | Angle |
|---|---|---|---|---|
| 251 | 10″–150# | 7⅛″ | 1″ | 15° |
| 252 | 10″–300# | 7⅝″ | 1⅛″ | 33¾° |
| 253 | 8″–150# | 5⅞″ | ⅞″ | 22½° |
| 254 | 8″–300# | 6½″ | 1″ | 45° |
| 255 | 6″–150# | 4¾″ | ⅞″ | 22½° |
| 256 | 6″–300# | 5 5/16″ | ⅞″ | 45° |
| 257 | 3″–300# | 3 5/16″ | ⅞″ | 22½° |
| 258 | 3″–150# | 3″ | ¾″ | 45° |
| 259 | 4″–150# | 3¾″ | ¾″ | 67½° |
| 260 | 4″–300# | 3 15/16″ | ⅞″ | 67½° |

In the above table:

Dimension E is the radius of the circle which contains the centers of all bolt holes for a particular flange, and for purposes of plate layout determines the distance from the pipe center point PC to the centerline of the particular bore.

Dimension F is the diameter of the required bore which corresponds to the bolt hole diameter of the flange to be accommodated.

Angle $\theta$ is the angle between the vertical centerline 250 and the center of the particular bores being located.

It is to be recognized that this layout is illustrative of only a single embodiment, and that flange plate jigs may be provided to accommodate any range of pipe sizes desired.

Thus, it can be seen that the workbench of the present invention embodies an economical, simple and efficient tool for use in fabricating pipe. Its value in labor savings and other economies will be quickly recognized by those having skill in the pipefitting art.

Obviously many modifications and variations of the present invention are possible in the light of the above teachings. It is, therefore, to be understood, that within the scope of the appended claims, the invention may be practiced otherwise than as specifically described.

What is claimed is:

1. A workbench for pipe assembly, comprising: a centrally positioned bed plate, and a bed plate positioned at each corner of the centrally positioned bed plate, each bed plate having a planar surface and the planar surfaces of each bed plate being positioned in a single plane, each corner positioned bed plate having a side in alignment with the corresponding side of both the centrally positioned bed plate and the bed plate positioned at one adjacent corner and another side in alignment with both the corresponding sides of the centrally positioned bed plate and the bed plate positioned at the other adjacent corner, whereby each side of the centrally positioned bed plate is in alignment with one side of each of the adjacent corner positioned bed plates, each bed plate containing a plurality of bores, a portion of the bores in each bed plate being in alignment with each other and with the bores of at least one other bed plate to provide a plurality of pipe centerlines.

2. The workbench as defined in claim 1 and further comprising: a plurality of pipe jigs removably mounted in the bores of the corner positioned and centrally positioned bed plates along pipe centerlines, said pipe jigs including pipe support means for maintaining pipes supported thereon at the same distance above the plane defined by the bed plates.

3. The workbench as defined in claim 2 wherein the pipe support means comprises a U-shaped recess in the pipe jigs.

4. The workbench as defined in claim 3 wherein each corner positioned bed plate includes a recessed portion in a side which is not aligned with a side of the centrally positioned bed plate and a flange jig mounting bore positioned at opposite sides of each recess.

5. The workbench as defined in claim 4 and further comprising a flange jig mounted in the flange jig mounting bores of at least one corner positioned bed plate, said flange jig comprising a plate having holes bored therethrough, said holes being positioned at the location of at least two bolt holes for each of a plurality of different sized flanges.

6. The workbench as defined in claim 5 wherein the flange jig further includes a pin means inserted in one of the flange bores and a boss having a bore therethrough in alignment with the other flange bore, and further comprising a pin inserted through the bore in the flange boss and the flange bore.

7. A workbench for pipe assembly, comprising: a centrally positioned rectangularly shaped bed plate, and a rectangularly shaped bed plate positioned at each corner of the centrally positioned bed plate, each bed plate having a planar surface and the planar surfaces of each bed plate being positioned in a single horizontal plane, each corner positioned bed plate having a side in alignment with the corresponding side of both the centrally positioned bed plate and the bed plate positioned at one adjacent corner and another side in alignment with both the corresponding side of the centrally positioned bed plate and the bed plate positioned at the other adjacent corner, whereby each side of the centrally positioned bed plate is in alignment with one side of each of the adjacent corner positioned bed plates, each bed plate containing a plurality of bores positioned on the plate in parallel rows, the bores in each row being equally spaced from each other and the bores in the next adjacent rows, whereby the bores are positioned on the corners of squares having the same dimensions, a portion of the bores on adjacent bed plates being in alignment with each other to provide a plurality of pipe centerlines, and a plurality of pipe jigs mounted in the bores of the corner positioned and centrally positioned bed plates along pipe centerline, each pipe jig being comprised of a vertically positioned plate having a U-shaped recess for supporting pipes at the same distance above the horizontal plane defined by the bed plates.

References Cited

UNITED STATES PATENTS

| | | | |
|---|---|---|---|
| 28,954 | 7/1860 | Austin | 248—71 |
| 386,674 | 7/1888 | Wells. | |
| 410,414 | 9/1889 | Hall | 269—45 |
| 576,758 | 2/1897 | Griffin | 269—100 |
| 2,928,364 | 3/1960 | Davis | 269—309 X |
| 3,317,205 | 5/1967 | Kerr | 269—296 X |

ROBERT C. RIORDON, Primary Examiner

D. R. MELTON, Assistant Examiner

U.S. Cl. X.R.

269—296